United States Patent Office 2,861,106
Patented Nov. 18, 1958

2,861,106

PROCESS OF PREPARING ALDEHYDES OR KETONES BY DEHYDROGENATION OF ALCOHOLS

Wolfgang Opitz, Knapsack, near Koln, and Werner Urbanski, Koln-Bickendorf, Germany, assignors to Knapsack - Griesheim Aktiengesellschaft, Knapsack, near Koln, Germany, a corporation of Germany No Drawing. Application February 24, 1955
Serial No. 490,402

Claims priority, application Germany February 26, 1954

6 Claims. (Cl. 260—596)

The present invention relates to a process for the dehydrogenation of saturated aliphatic alcohols having a straight chain and being of a low molecular weight or of cyclic primary and secondary alcohols, preferably alcohols containing 2 to 6 carbon atoms, into the corresponding aldehydes or ketones by leading the alcohol vapours, at raised temperatures, over a catalyst comprising copper and small amounts of chromium, an alkali metal and oxygen.

In industrial practice the dehydrogenation of alcohols, for instance of isopropanol, into acetone, is carried out on a large scale. As catalysts, there are used, on the one hand, zinc oxide or brass, on the other hand copper catalysts.

When using zinc oxide and brass catalysts it is necessary to operate at elevated temperatures of about 400° C. to about 500° C. Thereby, secondary reactions increasingly occur, for instance the formation of olefines by separation of water and, before all, decompositions of the acetone at the iron tubes.

When operating by means of a copper catalyst, these secondary reactions do not occur, as it is possible to work at a lower temperature, but the durability of the catalyst is reduced.

It is also known to dehydrogenize ethanol in the presence of copper catalysts containing small amounts of chromium. However, these catalysts prepared by impregnating silica which is used as carrier with solutions of copper nitrate, chromium nitrate and subsequent drying and baking do not contain an alkali metal and, after having been in operation for about 250 hours, undergo a reduction of activity of about 20%. Besides that, the yield amounts to less than 40%.

It has also been attempted to stabilize the catalyst by means of oxides and hydroxides of the alkali and alkaline earth metals. Under the influence of these alkali metal oxides and alkaline earth metal oxides, however, condensation reactions readily take place.

Now, we have found a copper catalyst containing, in addition to small amounts of oxygen, also small amounts of chromium and alkali metal oxide, which is effective at a relatively low temperature, i. e. between about 250° C. and about 380° C. It keeps an activity of long duration and, in consequence of its only insignificant alkalinity does not cause any secondary reactions worth mentioning.

The catalyst according to the invention is prepared in that way that copper compounds, such as copper hydroxide, cuprous oxide or, advantageously, cupric oxide, are impregnated with a chromium salt solution showing an alkaline reaction, for instance a sodium chromate solution, that they are applied, if required, onto carriers and then dried. The catalyst thus obtained may be used directly, i. e., without prior reduction. In this case, reduction occurs during the initial phase of the reaction. However, it is advantageous to reduce the catalyst prior to use in the reaction. Such reduction can be carried out by treating the catalyst at relatively low temperatures, for instance, between 200° C. and 300° C. with hydrogen to effect reduction of a considerable amount of the cupric oxide to copper and reduction of the high valent chromium to trivalent chromium. If need be, the reduction can be carried out by adding nitrogen whereby too rapid a reaction and a thereby caused sintering can be avoided.

A suitable catalyst can, for instance, be prepared as follows:

Cupric oxide is precipitated of its salts by means of sodium carbonate at 80° C. to 90° C., washed until neutral and dried at 100° C. This fine-grained cupric oxide is comminuted and impregnated with an aqueous solution, for instance a sodium chromate solution of about 10% strength, whereby 0.5–3 parts by weight of $Cr_2O_3$ are calculated for 97–99.5 parts by weight of CuO. Then water is added to the mass in such an amount that an aqueous suspension is obtained which can easily be applied onto pumice or another known carrier, for instance diatomaceous earth. However, it is also possible to press the mass after stirring with water, without addition of carriers, in order to obtain shaped bodies or tablets, eventually by adding a binder, for instance an aqueous solution of methyl cellulose. The catalyst is then dried, at first suitably at a temperature of e. g. 100° C., then at a high temperature of e. g. between 600° C. and 800° C. whereby the abrasion resistance can be considerably increased. It is useful to fix the baking temperature high enough that the binder, in the aforementioned example the methyl cellulose, bakes, thus giving to the catalyst an increased porosity. The impregnation can also be carried out by spraying a chromate solution onto the copper oxide which can, for instance, already have been applied onto a carrier or compressed to form shaped bodies.

The catalyst can be regenerated by oxidation by means of air and by subsequent reduction by means of hydrogen.

The chromium salt is added to the oxygen-containing copper compound suitably in small amounts only, advantageously in a quantity of about 0.5–3%, preferably 0.5% to 2% of $Cr_2O_3$ referred to the total content of chromium oxide and oxygen-containing copper compound, the latter being calculated as cupric oxide. The addition of considerably larger quantities of chromium salt is not recommendable as, otherwise, the risk is given that in consequence of the separation of water, olefines may be formed and, simultaneously, the carbonyl group may again be partially hydrogenated.

As chromium salts for the impregnation there can be used soluble alkali metal chromates and peroxychromates showing an alkaline reaction, especially the sodium and potassium salts readily accessible in industry, and, thereof, especially the chromates.

There are suitable, for instance, sodium chromate, potassium chromate, rubidium chromate, caesium chromate, lithium chromate, as such, or in mixtures, or also in the form of solutions which are obtained by adding liquors to the dichromate solutions. The peroxy chromates $Me_3CrO_8$, in which "Me" means a monovalent alkali metal, of the same alkali metals can also be used. All these chromium salts contain at least double the molar quantity of alkali metal oxide compared with chromium oxide. The limited amounts of chromium salts showing an alkaline reaction and added to the catalyst according to the invention, impart to the catalyst a reduced alkalinity. Besides that, the small chromium content shows an activating effect.

Small amounts of alkali liquors or salts can equally be added to the chromium salt, for instance sodium carbonate, sodium bicarbonate or salts of organic acids such as sodium acetate, sodium oxalate etc. or the corresponding salts of the other alkali metals. These substances are added, advantageously, in such an amount that the chromium content amounts to between 0.5% and 3% calculated as $Cr_2O_3$ onto the sum of CuO and $Cr_2O_3$, and that the alkali metal oxide content corresponds at least to about double the amount of mols and at most to six times the molar amount of the $Cr_2O_3$.

According to the process of the present invention, any saturated primary or secondary aliphatic alcohol or saturated cyclic compound, preferably those containing 2 to 6 carbon atoms, may be dehydogenated. Examples of such alcohols include ethyl alcohol, propyl alcohol, isopropyl alcohol, butanol, secondary butanol, primary and secondary pentanols and hexanols, cyclopentanol and cyclohexanol. The time of residence is determined by the charge of the catalyst which varies according to the alcohol used. It may, for instance, amount from about 1:1 to about 1:8, preferably from about 1:2 to about 1:4. This means that per each liter of liquid alcohol reacted per hour 1–8 parts by volume of catalyst are used.

For the dehydrogenation of secondary alcohols into the corresponding ketones temperatures of about 250° C. to about 380° C., preferably between 250° C. and 360° C. are applied, and thereby theoretical yields, referred to the reacted alcohol, are attained in practice.

For the dehydrogenation of primary alcohols into the corresponding aldehydes, temperatures of about 250° C. to about 380° C., preferably such between about 280° C. and about 340° C. are applied. Also in this case very good yields are obtained. For instance, ethyl alcohol can be converted into acetaldehyde. Up to now, this procedure was carried out according to the oxidation process of the following equation:

$$2CH_3-CH_2OH + O_2 = 2CH_3-CHO + 2H_2O$$

On a large industrial scale ethyl alcohol is oxidized over the silver catalyst by means of air in order to obtain acetaldehyde. Recently, attempts have been made to produce acetaldehyde by dehydrogenizing ethanol.

Up to now, however, it has been difficult to find a suitable catalyst for this purpose. This catalyst should operate at the lowest possible temperature in order to avoid the decomposition of the acetaldehyde. On the other hand, its alkalinity can only be a limited one in order to ensure its dehydrogenating effect and in order to avoid an aldol condensation. The known cupric oxide catalysts show the disadvantage that they are of a reduced durability. Additions of stabilizers, such as manganese oxide, zinc, cobalt etc. increase the durability of the catalyst, but, on the other hand, favour the formation of by-products.

These disadvantages can largely be avoided by applying the catalysts prepared according to the invention.

The following examples serve to illustrate the invention, but they are not intended to limit it thereto:

Example 1

An isopropyl alcohol of about 90% strength is lead over 0.5 l. (312 g.) of a catalyst prepared by applying an impregnated cupric oxide of the above-mentioned composition onto grains of pumice, said catalyst containing in addition to pumice and alkali metal oxide 48.8% of CuO and 0.8% of $Cr_2O_3$, referred to the oxides. The charge per hour of the catalyst amounts to about 200 to about 250 ml. of isopropyl alcohol. The following yields of acetone are obtained:

| Temperature | Duration of operation, hours | Conversion, percent by weight (the remainder being unchanged isopropyl alcohol) | Yield of acetone referred to isopropanol converted |
|---|---|---|---|
| 260–270 | 32 | 88.3 | 99.4 |
| 270 | 448 | 89.2 | 98.4 |
| 300 | 816 | 89.5 | 99.0 |

In the same way secondary butyl alcohol can be converted into methyl-ethyl-ketone.

Example 2

Ethyl alcohol of 95% (by volume) strength is led over 2.2 l. corresponding to 1230 grams of a catalyst prepared according to Example 1 and containing 39.64% of CuO and 0.39% of $Cr_2O_3$, referred to the oxides. The charge per hour of the catalyst amounts to about 480 ml. of ethanol. The following yields were obtained at temperatures of 280° C. to 340° C. within 480 hours of operation and at a conversion of 72% by weight.

Yield in mol-percent, referred to the ethanol converted:

| $CH_3CHO$ | $CH_3COO-C_2H_5$ | $CH_3COOH$ | $CH_4$ | CO | Total yield |
|---|---|---|---|---|---|
| 88.5 | 4.0 | 3.1 | 1.1 | 1.2 | 97.9 |

We claim:

1. A process for preparing a catalyst which comprises applying an aqueous solution of an oxygen-containing chromium salt to a pulverulent mass of CuO, said chromium salt being a member of the group consisting of sodium chromate, potassium chromate, rubidium chromate, caesium chromate, lithium chromate, mixtures of said chromates, and peroxy chromates of the formula $MeCrO_8$ wherein Me is a monovalent alkali metal, forming shaped bodies from said mixture of CuO and chromium salt and heating said bodies to a temperature of between about 100° C.–800° C. to form a reaction product containing CuO, $Cr_2O_3$ and alkali metal oxide, said chromium salt being applied in such a concentration that the proportion of CuO to $Cr_2O_3$ in the reaction product is about 97–99.5 parts by weight CuO to about 3–0.5 parts by weight $Cr_2O_3$ and the proportion of alkali metal oxide in the reaction product is about 2 to 6 times the molar amount of the $Cr_2O_3$.

2. The process of claim 1 wherein the shaped bodies are prepared by forming an aqueous suspension of the CuO and chromium salt mixture, and applying said suspension to inert carrier particles.

3. The process of claim 1 wherein the shaped bodies are prepared by adding a binder to the CuO and chromium salt mixture and compressing the resultant mixture.

4. A process for dehydrogenating a saturated aliphatic alcohol which comprises passing the alcohol over a catalyst at a temperature of about 250° C.–380° C., said catalyst consisting essentially of about 97–99.5 parts by weight CuO, about 0.5–3 parts by weight $Cr_2O_3$ and an alkali metal oxide comprising about 2 to 6 times the molar amount of the $Cr_2O_3$, the said catalyst being prepared by applying an aqueous solution of an oxygen containing chromium salt to a pulverulent mass of CuO, said chromium salt being a member of the group consisting of sodium chromate, potassium chromate, rubidium chromate, caesium chromate, lithium chromate, mixtures of said chromates, and peroxy chromates of the formula $MeCrO_8$ wherein Me is a monovalent alkali metal, forming shaped bodies from said mixture of CuO and chromium salt and heating said bodies to a temperature of between about 100° C.–800° C.

5. The process of claim 4 wherein the catalyst includes an inert carrier and said CuO comprises about 39–49% of the total catalyst.

6. A catalyst consisting essentially of about 97–99.5 parts by weight CuO, about 0.5–3 parts by weight $Cr_2O_3$ and an alkali metal oxide comprising about 2 to 6 times the molar amount of the $Cr_2O_3$, the said catalyst being prepared by applying an aqueous solution of an oxygen containing chromium salt to a pulverulent mass of CuO, said chromium salt being a member of the group consisting of sodium chromate, potassium chromate, rubidium chromate, caesium chromate, lithium chromate, mixtures of said chromates, and peroxy chromates of the formula $MeCrO_8$ wherein Me is a monovalent alkali metal, forming shaped bodies from said mixture of CuO and chromium salt and heating said bodies to a temperature of between about 100° C.–800° C.

References Cited in the file of this patent

UNITED STATES PATENTS

| | | |
|---|---|---|
| 1,271,013 | Bosch et al. | July 2, 1918 |
| 1,889,672 | Larson | Nov. 29, 1932 |
| 1,902,160 | Frazer et al. | Mar. 21, 1933 |
| 1,977,750 | Young | Oct. 23, 1934 |
| 2,071,704 | Norman et al. | Feb. 23, 1937 |
| 2,218,457 | Winans | Oct. 15, 1940 |
| 2,290,439 | Lenth et al. | July 21, 1942 |
| 2,407,373 | Kearby | Sept. 10, 1946 |

FOREIGN PATENTS

| | | |
|---|---|---|
| 681,611 | Great Britain | Oct. 29, 1952 |

UNITED STATES PATENT OFFICE

CERTIFICATE OF CORRECTION

Patent No. 2,861,106                          November 18, 1958

Wolfgang Opitz et al.

It is hereby certified that error appears in the printed specification of the above numbered patent requiring correction and that the said Letters Patent should read as corrected below.

Column 4, lines 41 and 72, and column 5, line 14, for "$MeCrO_8$", each occurrence, read -- $Me_3CrO_8$ --.

Signed and sealed this 7th day of April 1959.

(SEAL)
Attest:

KARL H. AXLINE
Attesting Officer

ROBERT C. WATSON
Commissioner of Patents